May 13, 1952 — L. J. SMITH — 2,596,300
HEATING SYSTEM
Filed Oct. 16, 1948 — 8 Sheets-Sheet 1

Inventor:
Lawrence J. Smith
By John Darley
Attorney.

May 13, 1952　　　L. J. SMITH　　　2,596,300
HEATING SYSTEM
Filed Oct. 16, 1948　　　　8 Sheets-Sheet 2
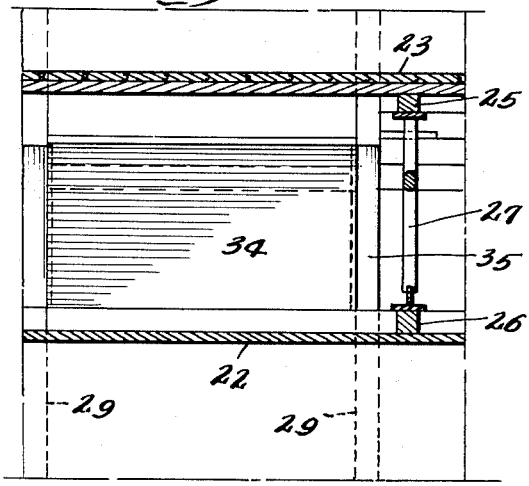
Fig. 4.
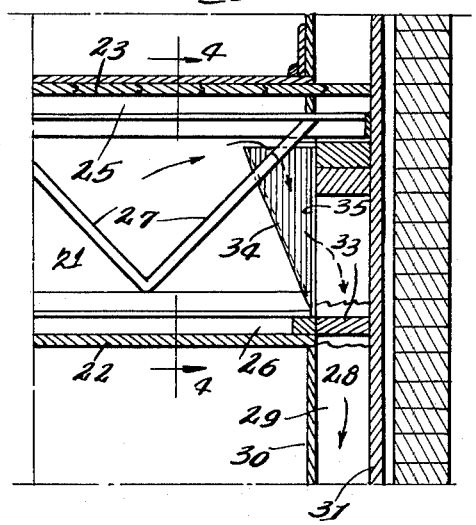
Fig. 3.
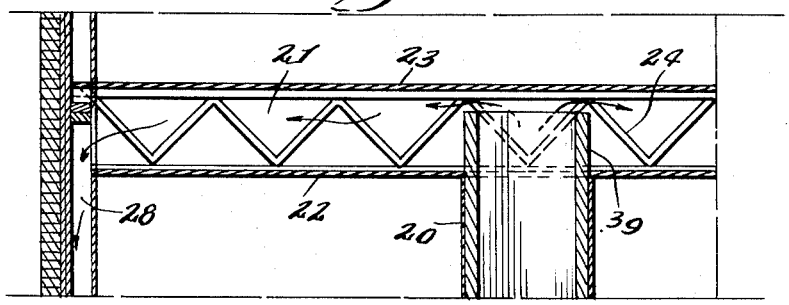
Fig. 7.
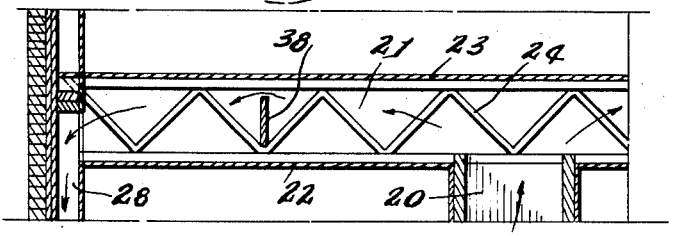
Fig. 6.
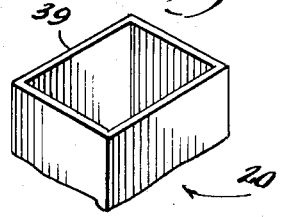
Fig. 8
Fig. 5.
Inventor:
Lawrence J. Smith.
By John W. Darley
Attorney.

May 13, 1952 L. J. SMITH 2,596,300
HEATING SYSTEM
Filed Oct. 16, 1948 8 Sheets-Sheet 3
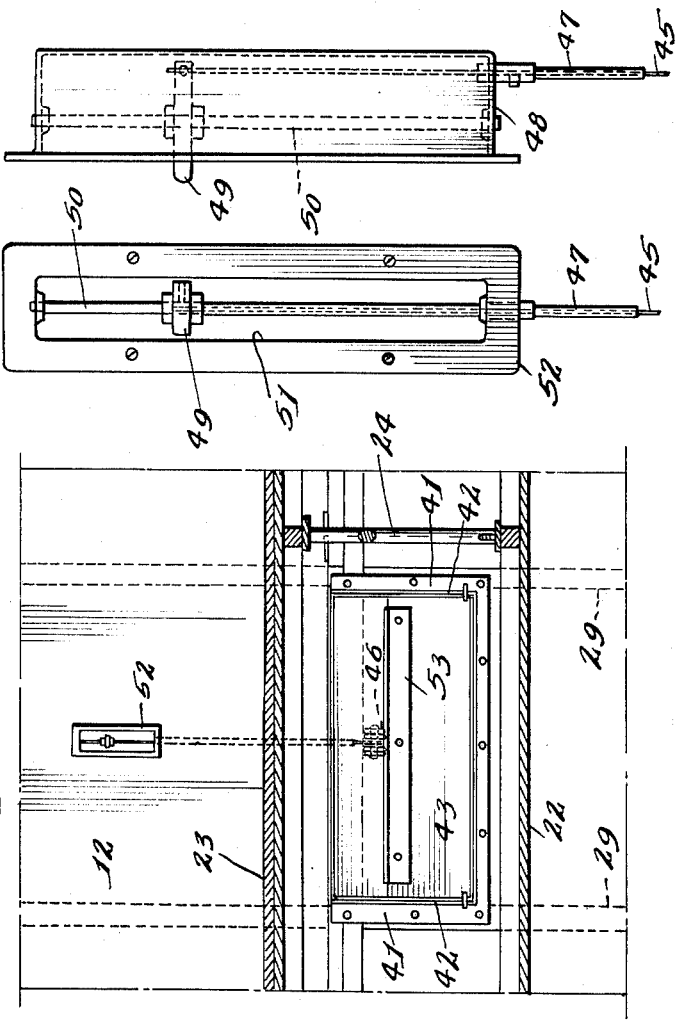
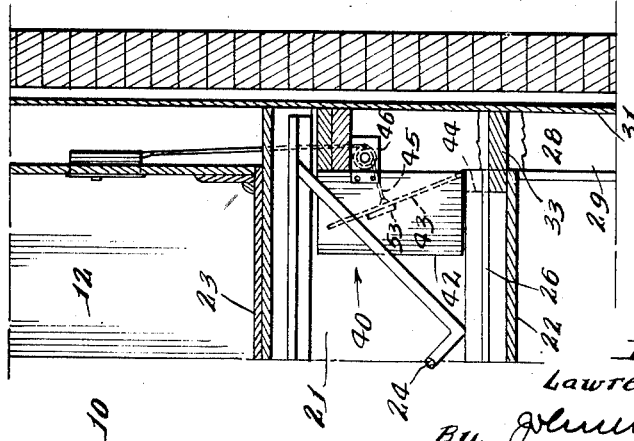
Inventor.
Lawrence J. Smith
By. John M Darley
Attorney.

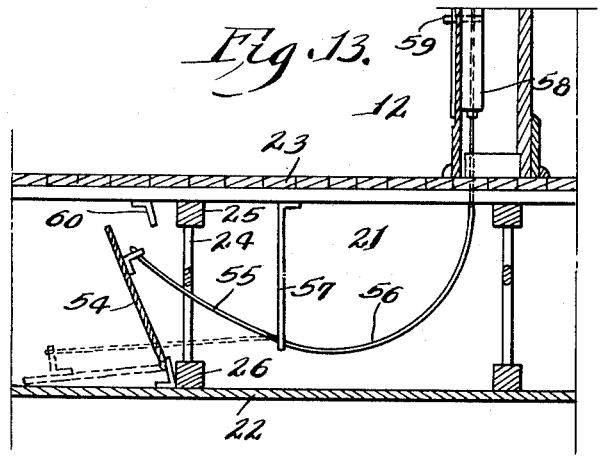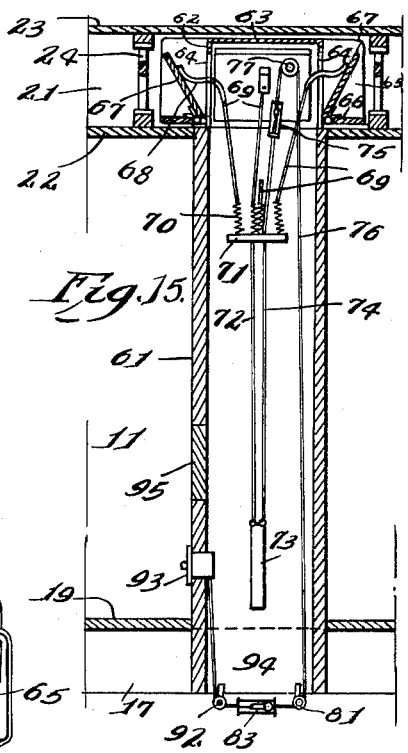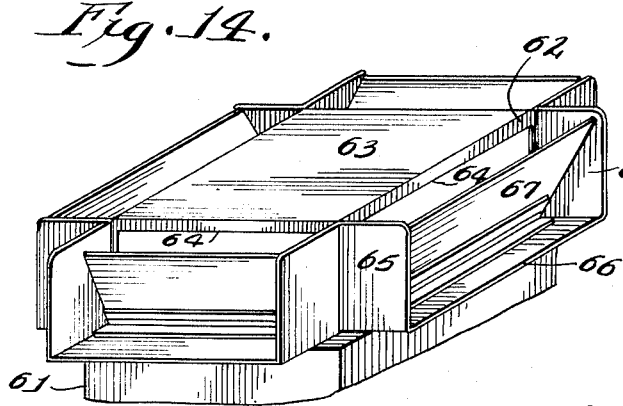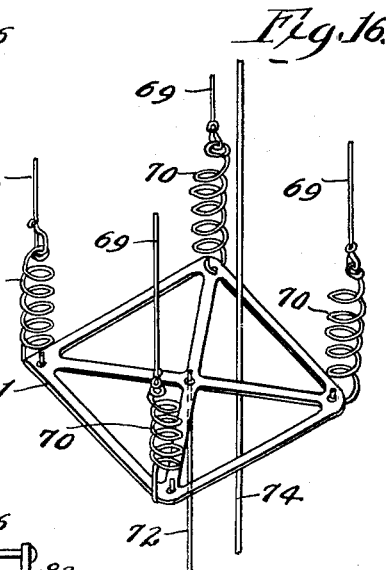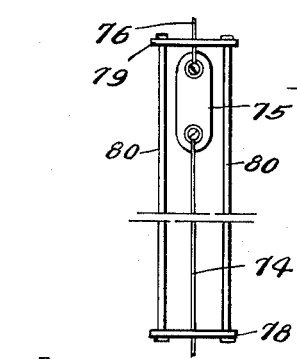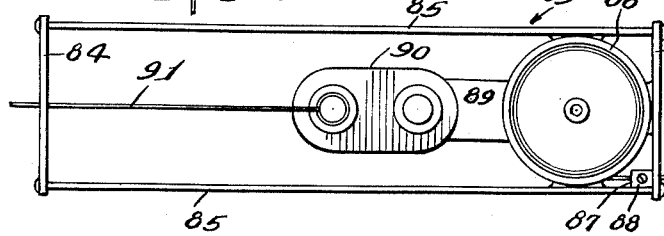

May 13, 1952     L. J. SMITH     2,596,300
HEATING SYSTEM
Filed Oct. 16, 1948     8 Sheets-Sheet 5
Fig. 20.
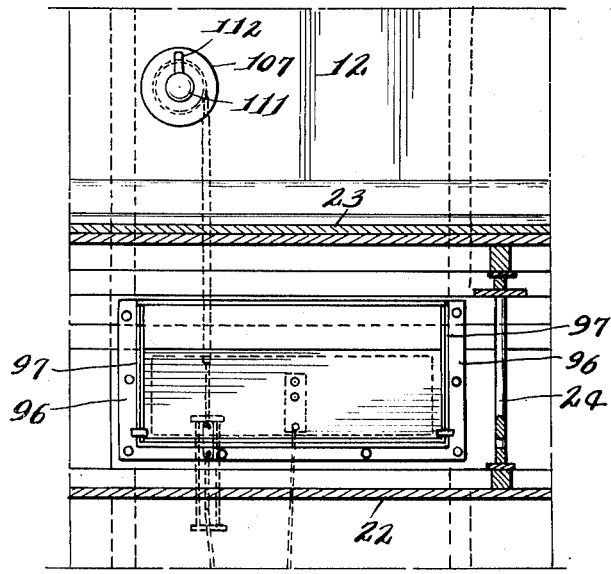
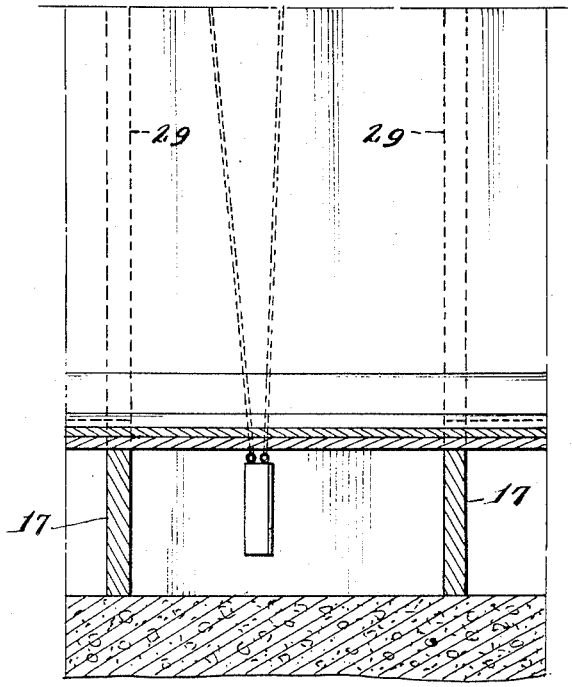
Fig. 19.
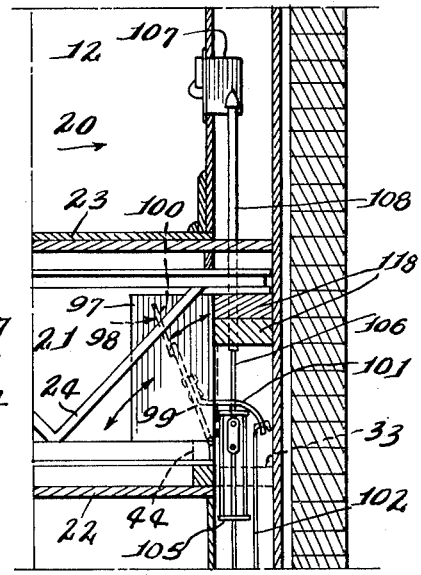
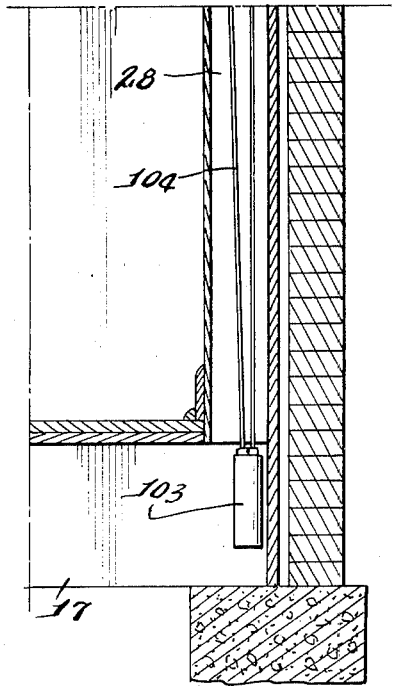
Inventor.
Lawrence J. Smith.
By
John M Darley
Attorney.

May 13, 1952 L. J. SMITH 2,596,300
HEATING SYSTEM
Filed Oct. 16, 1948 8 Sheets-Sheet 6
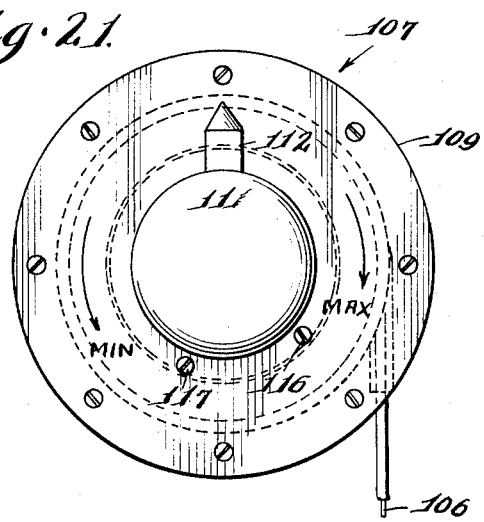
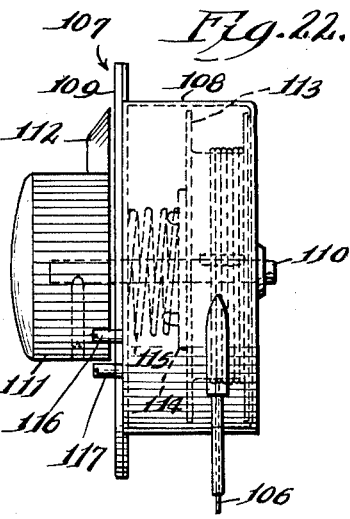
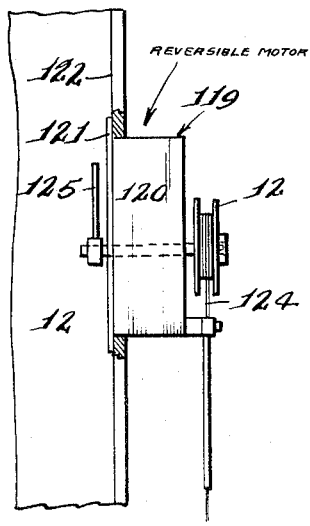
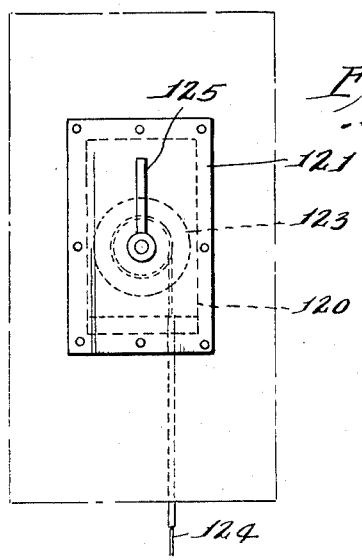
Inventor.
Lawrence J. Smith
By John M. Darley
Attorney.

May 13, 1952 L. J. SMITH 2,596,300
HEATING SYSTEM
Filed Oct. 16, 1948 8 Sheets-Sheet 7

Inventor:
Lawrence J. Smith.
By John Darley
Attorney.

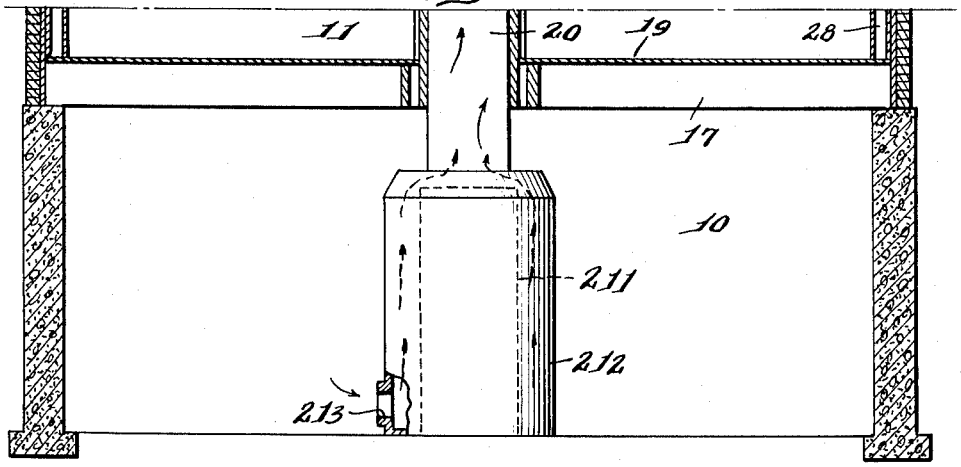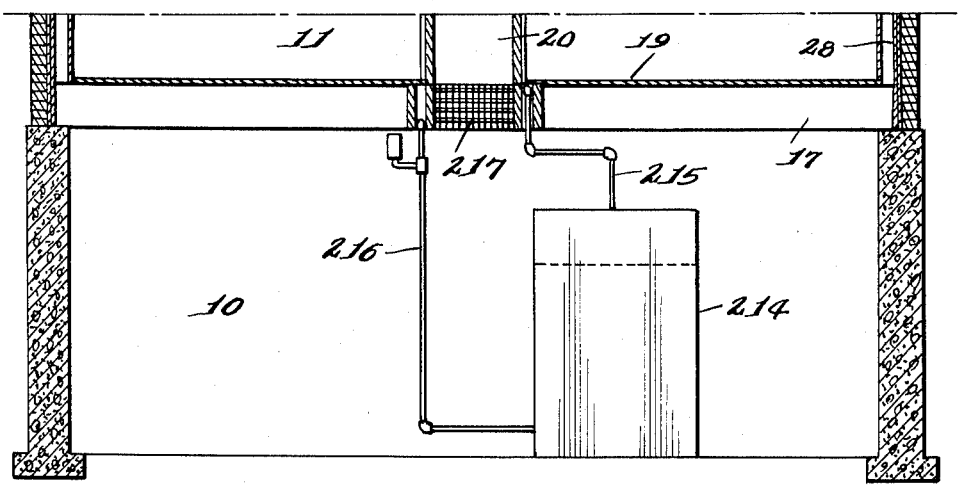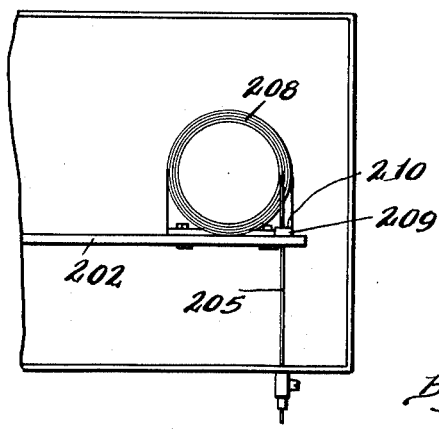

Patented May 13, 1952

2,596,300

UNITED STATES PATENT OFFICE 2,596,300

HEATING SYSTEM

Lawrence J. Smith, Oak Park, Ill., assignor to Bell & Gossett Company, Morton Grove, Ill., a corporation of Illinois Application October 16, 1948, Serial No. 54,889

10 Claims. (Cl. 237—69)

1

My invention relates to heating systems for buildings and more particularly to that type in which the room spaces are warmed by circulating heated air through the joist and studding or interwall spaces of the building.

It has been ascertained that where such a system is used in a multistory building, considerable difficulty is encountered in proportioning the supply of heat to the upper and lower rooms in accordance with their respective requirements. For example, in a two story dwelling, the heated air thermogravitationally circulates upwardly from the cellar or basement constituting a plenum chamber over a heat transfer coil and through a stack to the joist space between the ceiling of the first floor rooms and the floor structure of the second floor rooms, from which the air returns to the basement through studding or other spaces in the side walls of the first floor. This arrangement is intended to provide a warm ceiling and floor for the lower and upper rooms, respectively, which radiate heat into the rooms on the respective floors.

In passing through the joist space, however, the warm air tends to stratify into a warm core and relatively cooler layers above and below the core. Since the heat transfer through the plaster ceiling of the first floor rooms is more rapid than that through the sub-floor and finished floor of the second floor rooms, the supply of heat to the upper floor rooms will be insufficient. In severe weather, the differential temperature between the two floors may be as much as 20° F. and regardless of weather, the problem is intensified if some part or all of the upper floor rooms is bounded by one or more outside walls. On the other hand, large glass areas on the first floor may require a larger supply of heat to this floor.

It is therefore one object of my invention to provide a heating system of the character indicated in which means are employed in the joist space for regulating the amount of heat transfer to the upper and lower rooms to the end that the rooms may have the same or different temperatures as required.

A further object is to devise a system as indicated in which the means takes the form of a baffle that may be fixed, or manually or automatically controlled to provide selected temperatures in the upper and lower rooms, the baffle exerting a directional effect on the flowing warm air in the joist space and guiding the warm portion thereof into more intimate contact with the sub-floor of the upper rooms.

2

A further object is to provide a movable baffle having the foregoing characteristics and a heating system incorporating the same wherein the baffle is additionally arranged to function as a fire door and is associated with one or more fusible links which upon rupture permit the baffle to close and stop circulation through the joist space, thus preventing the spread of a fire by drafts through the interwall and joist spaces.

These and further objects of the invention will be set forth in the following specification, reference being had to the accompanying drawings, and the novel means by which said objects are effectuated will be definitely pointed out in the claims.

In the drawings:

Fig. 3 is an enlarged, fragmentary section of a baffle and the adjacent portion of the building as viewed in Fig. 1.

Fig. 4 is a section along the line 4—4 in Fig. 3.

Fig. 5 is a perspective view of the baffle shown in Figs. 1, 2, 3 and 4.

Fig. 6 is a fragmentary section showing a modified form in which a fixed baffle is intermediately placed between the stack and each end of and extending for the full width or length of the joist space as conditions may determine.

Fig. 7 shows a further modification in which the baffling action is accomplished by an upward extension of the stack into the joist space.

Fig. 8 is a perspective view of the upper or baffle end of the stack as viewed in Fig. 7.

Fig. 9 is a view similar to Fig. 3, but showing an adjustable baffle that is manually controlled from an upper room.

Fig. 10 is a sectional view looking in the direction of the arrow 10 in Fig. 9.

Figs. 11 and 12 are front and side views, respectively, of the manual adjuster shown in Figs. 9 and 10.

Fig. 13 is a sectional view showing a further modification which incorporates a variation of the adjustable feature illustrated in Fig. 9 in a baffle arrangement which extends throughout a length or width dimension of the joist space.

Fig. 14 is a perspective view showing a modified form of the stack as illustrated in Fig. 7 in which each side of the upper end thereof is provided with an adjustable baffle.

Fig. 15 is a sectional view showing the association of the adjustable baffles illustrated in Fig. 14 with fusible links whose rupture permits interruption of circulation through the stack.

Fig. 16 is a perspective view of a spider that provides a common connection between the baffles and the adjusting means.

Fig. 17 is an enlarged, front elevation of a fusible link employed in the modifications shown in Figs. 15, 19 and 20.

Fig. 18 is a plan view of one of the fusible links shown in Fig. 15 and which includes a reel on which surplus wire is wound.

Fig. 19 is a sectional view showing a modification of the adjustable baffle illustrated in Fig. 9, the difference consisting in that a portion of the baffle is arranged to serve as a fire door.

Fig. 20 is a view, partially in section, looking in the direction of the arrow 20 in Fig. 19.

Figs. 21 and 22 are front and side views, respectively, of the manual adjuster shown in Figs. 19 and 20.

Figs. 23 and 24 are front and side views, respectively, of a reversible motor that may be substituted for the manual adjuster shown in Figs. 19 and 20.

Fig. 27 is an elevation of a reel which may be associated with the control shown in Fig. 26 where fusible links are used with baffles that are fashioned as fire doors.

Figs. 28 and 29 are fragmentary sections similar to Fig. 1, but showing, respectively, a hot air furnace and a steam boiler as primary heat sources.

For purpose of simplifying the description, the invention will be described as applied to a two story building which includes a cellar or basement and first and second floor rooms which extend between two side walls of the building and which are hereinafter designated as the lower and upper rooms, respectively. Further, it will be understood that, since the joist space between the first and second floors provides the reservoir from which heat is transferred to the rooms and since this space extends between the opposite side walls of the building, the first and second floors may be divided into as many rooms as desired without affecting the situation.

Figure 1:
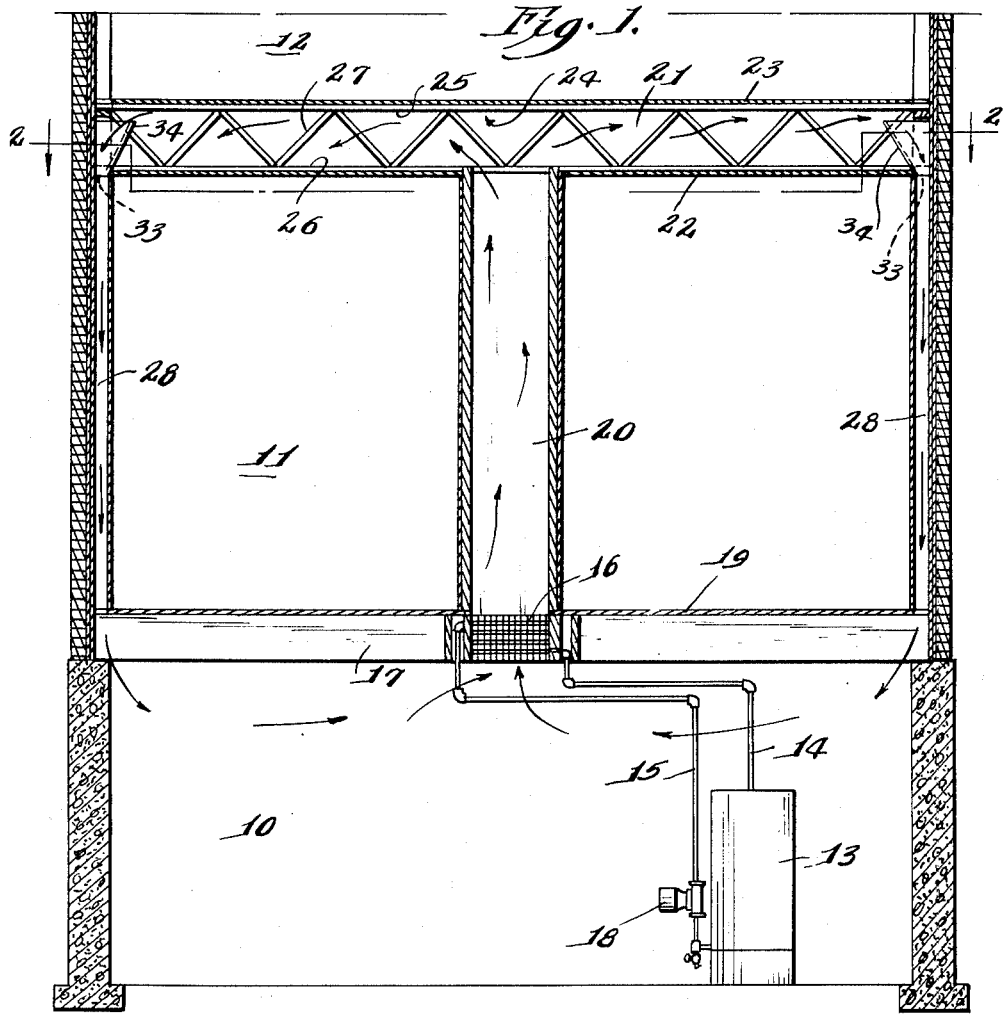
Fig. 1 is a sectional elevation of a typical, two story building, including a basement or cellar, the section being taken generally along the line I—I in Fig. 2, and showing the application of fixed baffles at the ends of the joist space and between selected pairs of side wall studding.

Referring to Figs. 1 to 4, inclusive, and immediately to Fig. 1, the building includes a basement 10, a lower room 11 and an upper room 12. A hot water heating boiler 13 is positioned in the basement and is connected by supply and return pipes 14 and 15, respectively, with a fin type, heat transfer coil 16 which is located between a pair of the first floor joists 17. The boiler 13, pipes 14 and 15, and coil 16 constitute a hot water system through which the water is forcibly circulated by a pump 18 responsive to a room thermostat (not shown) which may be located in either of the rooms. In accordance with the usual practice, the boiler may be automatically or hand fired and, in the event of the former, the boiler may be equipped with controls (not shown) for maintaining the boiler water above a predetermined temperature.

The coil 16 is exposed on its under side to the air in the basement 10 and the lower room floor 19 is cut away above the coil to provide communication with the lower end of a stack 20 whose upper end communicated with the open joist space 21 between the lower room ceiling 22 and the upper room floor 23. Supported on the side walls of the building are open joists 24 of well known truss construction which include compression and tension members 25 and 26, respectively, that are connected by struts 27. These joists are separated in spaced parallel relation across one horizontal dimension of the joist space and their open construction enables the warm air to circulate freely throughout the joint space. The opposite ends of the joist space communicate with the basement 10 through ducts 28 (see Figs. 1, 3 and 4), each of which is included between a selected pair of studding 29—29, the lower room plaster walls 30 and interior sheathing 31. It will be understood that this manner of forming the ducts 28 is by way of example only and would be employed in the characteristic frame or veneer type of house construction. Other duct arrangements may be adopted for the return flow of the air depending upon the type of construction, such as chase spaces in solid masonry construction or other styles of grooves or channels.

From the foregoing, it will be apparent that, when hot water is pumped through the coil 16, the stack 20, joist space 21, ducts 28 and basement 10 constitute a thermogravitational, circulatory system for heated air which flows upwardly through the stack 20 into the joist space 21 and returns through the ducts 28 to the basement 10 which acts as a plenum chamber. The ceiling 22 and the floor 23 are thus warmed and the heat is radiated into the rooms 11 and 12. To insure effective distribution of the heated air in the joist space 21, it is necessary that the delivery end of the stack 20 and the inlet ends of the ducts 28 be properly related. For example, as shown diagrammatically in Fig. 2, if the lower room 11 is four sided and is bounded on one side by an inside wall 32, i. e., a wall which is not exposed to the outside weather, the stack 20 preferably extends therealong as shown, because such a position conserves heat and the inlet ends of the ducts 28 are then positioned in those opposite corners of the room which are the more remote from the stack. This arrangement provides a good spread for the air and eliminates dead air spaces as far as possible which would otherwise reduce heat transfer to the rooms. The upper ends of the spaces between all pairs of studding 29, other than that pair which define the ducts 28, are blocked by closures 33 (see Figs. 1 and 3) so that downward flow of air is confined to the ducts. Where all boundary walls of the lower room are outside walls, the stack 20 preferably extends up through the center of the room and the inlet ends of the ducts 28 may then be located in the room corners, or four in all. The stack 20 may also be included between a pair of closely adjacent, inside walls.

So far as described, the heating system is well known, but for reasons above discussed, difficulty has been experienced in properly balancing the heat supply between the upper and lower rooms since, in the usual situation, a larger proportion of the heat tends to flow in the easier direction which is towards the lower floor ceiling 22. Generally speaking, the flow ratio will depend upon the character of the material used in the first floor ceiling and the floor structure of the second floor. In some cases, therefore, the heat transmission rate through the ceiling may be slower than that through the floor structure. The several baffle arrangements presently described have been designed to establish desired flow ratios for any building construction.

Figure 2:
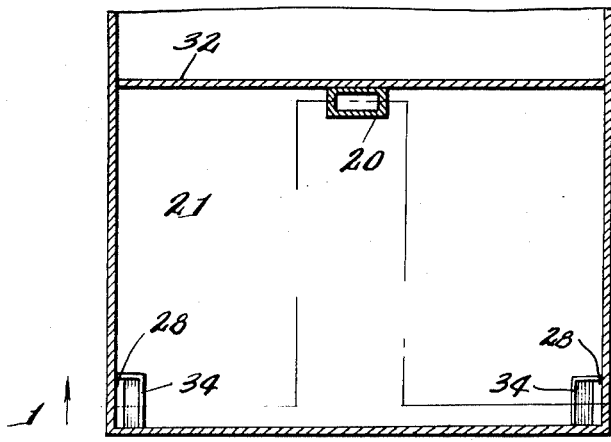
Fig. 2 is a diagrammatic, plan section taken generally along the line 2—2 in Fig. 1 and showing a suggested, position relationship of the stack and baffles in the joist space which insures that the heated air will occupy the whole of this space, the joists and studding being omitted.

Referring to Figs. 1 to 5, inclusive, fixed baffles 34 are positioned at opposite ends of the joist space 21 in locations relative to the stack 20 as shown in Fig. 2 and in registering relation with the ducts 28. Each baffle 34 (see Fig. 5) includes a pair of ears 35, triangular end walls 36—36 normal thereto, and an inclined front wall 37 connecting the walls 36. The baffle 34 is bridged between and has its ears 35—35 secured to that pair of studding 29—29 which defines a duct 28, with the front wall 37 inclined upwardly and inwardly of the joist space 21 and terminating short of the flooring 23, all as shown in Fig. 3.

As indicated, the baffle 34 provides a funnel-like means of communication between the joist space 21 and the associated ducts 28 and its height is such that the wall 37 thereof provides a barrier to the warm air flowing through the joist space such that the warmer portions thereof are caused to pass closer to the floor 23 than to the ceiling 22. Hence, a relatively larger part of the heat is transferred to the upper floor and a more accurate and dependable balance of heat as between the floors can be secured. The height of the baffle 34 may be varied as desired, depending upon the heat requirements which, by reason of the fixed nature of the baffle, it is assumed will not change.

A modification of the fixed baffle construction is illustrated in Fig. 6 wherein parts like those shown in Figs. 1 to 5, inclusive, are designated by like numerals. This numbering procedure will be followed in subsequent modifications where applicable. The Fig. 6 arrangement differs from that above described in that a strip baffle 38 having a height comparable to that of the baffle 34 is vertically positioned between the stack 20 and each duct 28, it being understood that a similar baffle would be located to the right of the stack, as viewed in the drawing. A further difference consists in the fact that the baffles 38 extend for the full, horizontal dimension of the joist space 21 which, in the present instance, is normal to the joists 24. This arrangement provides substantially the same increased heating effect on the floor 23 relative to the ceiling 22 that the baffle 34 accomplishes. The baffles 38 may also be located parallel to the joists 24 instead of normal as shown, but however located with respect to the joists, their number and position will depend upon the relation of the stack and ducts. The number of the inlets to the ducts 28 may be varied and related as desired to secure an efficient distribution of warm air in the joist space, but, in any case, they are positioned on the far side of the baffle 38 from the stack 20 and preferably along an outside wall or walls whose cooling effect assists the circulatory action.

A further fixed baffle modification is illustrated in Figs. 7 and 8 wherein control of the air flow for the same purpose as discussed above is achieved by providing the stack 20 with an upward extension 39 that projects between a pair of the joists 24 and terminates short of the floor 23. This arrangement also directs the warm air into more intimate contact with the floor 23. Where the stack shown in Figs. 7 and 8 is positioned along an inside wall, as in Fig. 2, the directing control on the warm air is exercised by three sides of the extension 39, but if spaced from all walls, all four sides of the extension are effective.

In Figs. 9 to 12, inclusive, is illustrated a further modification which includes an adjustable baffle that may be variably positioned as desired to allocate the heat flow to the upper and lower rooms in any ratio. This baffle structure is indicated generally by the numeral 40 and includes a U-shaped frame whose vertical limbs 41—41 are fastened, within the joist space 21, to the inward faces of that pair of studding 29 which define the duct 28 and a wing 42 extending inwardly of the joist space 21 from each limb. It will be understood that the baffle structure 40 is located with respect to the stack 20 according to the arrangement discussed in connection with Fig. 3 and that all spaces between the studding 29 other than those which serve as the ducts 28 are blocked by closures 33.

A baffle 43 is pivoted at its lower end between the wings 42 to control air flow to the ducts 28 and to direct more or less heat to the floor 23, flow between the bottom of the baffle structure 40 and the tension members 26 of the joists 24 be blocked by closures 44 which register with the ducts 28. The position of the baffle 43 is adjusted by a wire 45, which preferably is characterized by the stiffness of piano wire, one end of which is attached to the baffle with an intermediate portion passing around a sheave 46 and slidably upward through a flexible tube 47 whose upper end is secured to the lower part of a casing 48 that is recessed in a side wall of the upper room 12. The upper end of the wire 45 passes within the casing 48 and is secured to a finger operated member 49 that is vertically slidable on a rod 50 bridged between the upper and lower ends of the casing 48. There is sufficient friction contact between the member 49 and rod 50 to insure the retention of the member in any position to which it is moved. A part of the member 49 projects through an elongated slot 51 that opens to the room 12 for convenient access by the operator and around the slot, the casing 48 includes a marginal flange 52 which overlies the inner face of the room wall. This flange may be calibrated according to any desired scale so that the position of the member 49 will indicate the division of heat to the upper and lower rooms.

When the member 49 is moved upwardly, the baffle 43 is swung clockwise, as viewed in Fig. 9, to thereby increase the heat flow to the upper room, while a contrary result is achieved when the member is moved downwardly. Counter-clockwise movement of the baffle 43, which is a gravity assisted movement, may be facilitated by attaching a weight 53 to the side of the baffle opposite to the connection of the wire 45 thereto and sufficiently removed from the baffle pivot to be effective.

Where the baffle extends completely across one horizontal dimension of the joist space 21, as in Fig. 6, the feature of adjustability may be incorporated therein and such an arrangement is illustrated in Fig. 13. The drawing shows only the baffle and the adjustable connection therefor and it will be understood that the baffle may be related to the stack 20 and ducts 28 as indicated in Fig. 6.

Referring to Fig. 13, the numeral 54 indicates the baffle which, in this case, extends parallel to the joists 24 across the joist space 21 and may be pivoted along its lower edge adjacent one of the joist tension members 26. The baffle 54, however, may extend normal to the joists as in Fig. 6. A wire 55 is secured at one end to the baffle 54 and is slidable through a curved, flexible tube whose opposite ends are respectively attached to a bracket 57 and the lower end of a casing 58, which is similar to the casing 48, and is recessed in a side wall of the upper room 12. The internal construction of the casing 58 is identical with that illustrated in Figs. 11 and 12 and it therefore includes a slidable finger operated member 59 to which the opposite end of the wire 55 is secured.

From the foregoing, it will be obvious that up and down movements of the member 59 will effect clockwise and counterclockwise movements of the baffle 54 between limiting positions determined by the angle 60 and the ceiling 22, all respectively, and with corresponding variations in the heat flow to the upper and lower rooms.

The adjustable baffle feature may also be incorporated as a part of the stack in an arrangement, similar to that illustrated in Fig. 7, in which the stack projects into the joist space 21. This construction, together with additional features, which enables the baffles to act as fire doors and stop circulation through the interwall and joist spaces and the stack in the event of fire, are illustrated in Figs. 14 to 18, inclusive.

Referring to Figs. 14 and 15, the numeral 61 indicates a stack which is comparable to the stack 20 in Fig. 7 and which also includes an extension 62 which projects well up into the joist space 21. The upper end of the extension 62 is closed by a wall 63 and, for simplicity of illustration, the stack 61 and its extension 62 are shown as being square in transverse section. Each side wall of the extension 62 includes an opening 64 which provides communication between the stack and the joist space 21. Because of this arrangement which provides a four-way or generally radiating supply of warm air to the joist space, the stack 61 would be positioned in the center of the lower floor, but if one opening 64 is eliminated, then the location of the stack relative to the ducts 28 may be as illustrated in Fig. 2. Other locations of the stack 61 may be employed, depending upon the number of openings 64, which number may be varied down to the minimum of one opening.

Marginally related to the vertical and lower edges of each opening 64 and projecting outwardly of the extension 62 are wings 65 and 66, respectively, and pivoted along the wing 66 and between the wings 65 is a baffle 67 which opens outwardly of and overlaps the edges of the opening 64. The wings 65 act to channel the air issuing through the associated opening 64 and while the baffle 67 is shown as pivoted on the wing 66, it may be pivoted on the wings 65 and the wing 66 eliminated.

A bracket 68 is secured to the side of each baffle 67 adjacent to and extending through the associated opening 64 and one end of a wire 69 is attached to each bracket. The four wires 69 thus provided have their opposite ends respectively connected to the upper ends of helical springs 70 (see Figs. 15 and 16) and the lower ends of the springs are respectively connected to the corners of a flat, square spider 71 which is positioned for free, vertical movement within the stack 61. Another wire 72 depends from and has its upper end secured to the center of the spider 71 and its lower end attached to a weight 73 which tends to rock the baffles 67 in directions closing the openings 64. The springs 70 insure that the pull of the weight will be applied to all of the baffles.

Adjustment of the baffles 67 for directing more or less of the warm air flowing through the joist space from the stack into contact with the upper room floor is accomplished by the following instrumentalities.

The lower end of a wire 74 is connected to the weight 73 by an attachment separate from the connection of the wire 72 to the weight and the other part of the wire 74 extends freely upward through the spider 71. The construction shown in Fig. 15 is arranged to have the baffles 67 act as fire doors which will automatically close the openings 64 under the pull of the weight 73 in the event of a fire in the building, thus preventing spread of the fire by drafts through the passages which form part of the heating system. Under these conditions, each baffle 67 is composed of heavier and more heat resistant material than if it were used only to control the movement of the warm air for the heating system.

To insure automatic closure of the baffles, the upper end of the wire 74 is connected to the lower end of a fusible link 75 (see Fig. 17) and the upper end of the link has attached thereto the lower end of a wire 76 which passes upward over a sheave 77 mounted within the stack extension 62 and thence downwardly within the stack 61. The link 75 is of well known construction and is contained within an open frame comprising end pieces 78 and 79 which are respectively apertured to receive the wires 74 and 76 and which are connected by rods 80—80 positioned on opposite sides of the link 75. If the link 75 is subjected to a temperature which causes its rupture, separating movements of the link pieces are limited by the end pieces 78 and 79, thus permitting easy replacement of a new link. As the drawing indicates, the link 75 is located generally at the junction of the stack 61 with the joist space 21.

The lower end of the wire 76 passes partially around a sheave 81 located within the stack at the bottom thereof and depending from a joist 17 and thence through an end piece 82 (see Fig. 18) forming part of a fusible link assembly generally indicated by the numeral 83. This assembly includes a second end piece 84 spaced from the end piece 82 and the end pieces are connected by spaced, parallel rods 85—85. Adjacent the end piece 82, a reel 86 is bridged between the rods 85 and a surplus quantity of the wire 76 is wound around the reel for a purpose presently explained. Between the reel 86 and the end piece 82, a block 87 is slidable on the wire 76 and is gripped thereto by a screw 88, thus preventing unwinding of the reel under normal operating conditions by engagement of the block 87 with the end piece 82.

The frame of the reel 86 is connected by a neck 89 with one end of a fusible link 90 while the other end of the link connects to a wire 91 which passes through the end piece 84, thence partially around a sheave 92 that also depends from the joist 17, and thence upwardly within the stack 61 for attachment to a manual adjuster, generally indicated by the numeral 93 in Fig. 15, that is recessed in a wall of the stack and exposed in the room 11 for easy access. The adjuster 93 is identical with that illustrated in Figs. 11 and 12, but is reversely operable for reasons presently noted.

Comparing Figs. 1 and 15, it will be noted that the heating coil 16, omitted from Fig. 15 for the sake of clarity, would be located in the space 94 in the latter figure, so that the fusible link 90 would be positioned beneath the coil 16 and hence exposed in the basement 10 beneath the joists 17.

The positions of the baffles 67 are regulated by the adjuster 93 to allocate heat to the upper and lower rooms, downward actuation of the adjuster, for example and as viewed in Fig. 15, freeing the weight 73 to drop further and thus rocking the baffles upwardly and directing the warm air into more direct contact with the upper room floor 23. A contrary result is obtained when the adjuster 93 is moved upwardly and, in this case, the pull of the weight 73 on the baffles 67 is temporarily relieved and the baffles rock downwardly by gravity until the slack previously created in the wire 72 is taken up by the new positions of the baffles and in which they are held by the weight.

In the event of fire on the premises, either or both of the fusible links 75 and 90 may be ruptured by the heat from the fire, and under any of these conditions, the dropping of the weight 73 thus effected causes the baffles 67 to close the openings 64, thereby interrupting the draft through the stack 61 and joist space 21. It will be understood that, as is well known in the art, the end pieces in the respective fusible link assemblies are sufficiently spaced to provide the required movements of the separated parts of the links 75 and 90. If the link 90 is ruptured, it may be easily replaced since it is accessible from the basement 10, but if the link 75 is destroyed, it is necessary to utilize the surplus wire 76 that is wound around the reel 86. The screw 88 is loosened, the reel 86 is unwound and sufficient wire 76 is pushed up in the stack 61 to enable the link 75 to be dropped in the stack until it registers with a hand hold cover 95 in the stack wall and in this position, it may be replaced. The wire 76 is then rewound on the reel 86 until the new link 75 is restored to the position shown in Fig. 15, after which the screw 88 is again tightened.

If the baffles 67 are not additionally required to act as fire doors, they may be made with lighter sections and the links 75 and 90 are omitted. Under these conditions, each baffle may be weighted on one side to facilitate their being rocked downward when the weight 73 is raised, as indicated in Fig. 9.

In Figs. 19 and 20 is illustrated a further modification which involves a manually controlled, fire door type of baffle which is similar in some respects to the construction shown in Figs. 9 and 10. As in the latter figures, the vertical limbs 96—96 of the baffle frame are fastened within the joist space 21 to that pair of studding 29 which define the duct 28 and a wing 97 extends inwardly of the joist space from each limb. This frame is located with respect to the stack 20 as discussed in connection with the arrangements shown in Figs. 3 and 9.

A baffle indicated generally by the numeral 98 is pivoted at its lower end between the wings 97 and it includes a lower, fire door portion 99 having an appropriate thickness and heat resistant properties, which is intended, under stated conditions, to interrupt communication between the joist space 21 and the duct 28, and an upper and lighter weight portion 100 whose upper edge determines by its adjusted position the heat allocation to the upper and lower rooms as already discussed.

An arm 101 secured to the baffle 98 extends within the duct 28 and has its end attached to the upper end of a wire 102 which extends downwardly within the duct and has its lower end affixed to a weight 103. Separately attached to this weight is the lower end of a wire 104 which extends upwardly through the duct 28 and has its upper end secured to one end of a fusible link 105, which is identical with the link shown in Fig. 17. A wire 106 provides a connection between the opposite end of the link and a manual adjuster 107, presently described, which is recessed in a side wall of the upper room 12, the wire as it leaves the upper end of the duct entering the lower end of a flexible tube 108 whose upper end is connected to the casing of the adjuster 107.

The adjuster 107 is more particularly illustrated in Figs. 21 and 22 to which reference will now be made. It includes an annular, horizontal casing 108 which is received in the upper room side wall, as indicated in Fig. 19, and has affixed to an end wall thereof a dial 109 which is exposed within the room and may be calibrated in any desired manner. A horizontal spindle 110, coaxial with the casing 108, is journaled in the opposite end walls of the casing 108 and extends through the dial 109 for connection with a knob 111 having a finger 112.

Also keyed to the spindle 110 within the casing 108 is a reel 113 on which a surplus quantity of the wire 106 is wound for a purpose presently explained. From the foregoing, it will be understood that rotation of the knob 111 produces up and down movements of the wire 106 and corresponding changes in the position of the baffle 98 for purposes noted above.

The knob 111 is maintained in any adjusted position by a disk 114 which frictionally engages an end of the reel and is held thereagainst by one end of a helical spring 115 whose opposite end abuts an end wall of the casing 108, the disk and spring being coaxial with the spindle 110. Rotation limits on the knob 111 are provided by stops 116 and 117 with which the finger 112 engages. Clockwise rotation of the knob, as viewed in Fig. 21, produces a like rocking of the baffle 98, as viewed in Fig. 19, to thereby allocate more heat to the upper floor 12, and a contrary condition is obtained when the knob is rotated in the opposite direction. The adjuster 107 may also be substituted for the comparable adjusters shown in Figs. 10 and 13.

In the event of fire, the fusible part of the link 105 ruptures and causes the baffle 98 to swing clockwise, as viewed in Fig. 19, until the fire door portion thereof abuts blocks 118 that are bridged between the studding 29—29 at the upper end of the duct 28. All communication between the joist space 21 and the duct 28 is thus interrupted. Replacement of the ruptured link 105 is effected by removing the stops 116 and 117, and thereafter unwinding the reel 113 sufficiently to drop the link to a position between the adjacent pair of joists 17 where it is accessible from the basement 10.

The strip baffle shown in Fig. 13 may also be arranged to operate as a fire door to prevent draft through the joist space and, in such an event, it may be regulated and controlled by an adjusting and fusible link mechanism comparable to that illustrated in Fig. 19.

In Figs. 23 and 24 is illustrated a reversible motor, operated control 119 that could be substituted for the manual adjusters shown in Figs. 10, 13 and 22. This control includes a reversible motor 120 whose frame is recessed in and whose control plate 121 is exposed through a side wall 122 of the upper room 12. The internal construction of this motor forms no part of the present invention and hence the wiring thereof and the controlling switches therefore are not illustrated. Preferably, the motor 120 is of the type which is restricted to a maximum shaft rotation of 180° in either direction, these rotation limits corresponding to the rocking limits of the associated baffle. Mounted on the motor shaft is a reel 123 having wound thereon wire 124 which may be connected to any of the baffles shown in Figs. 10, 13 and 19. A pointer 125 is also connected to the motor shaft to sweep over the control plate 121 which may be calibrated to indicate baffle position.

Figure 25:
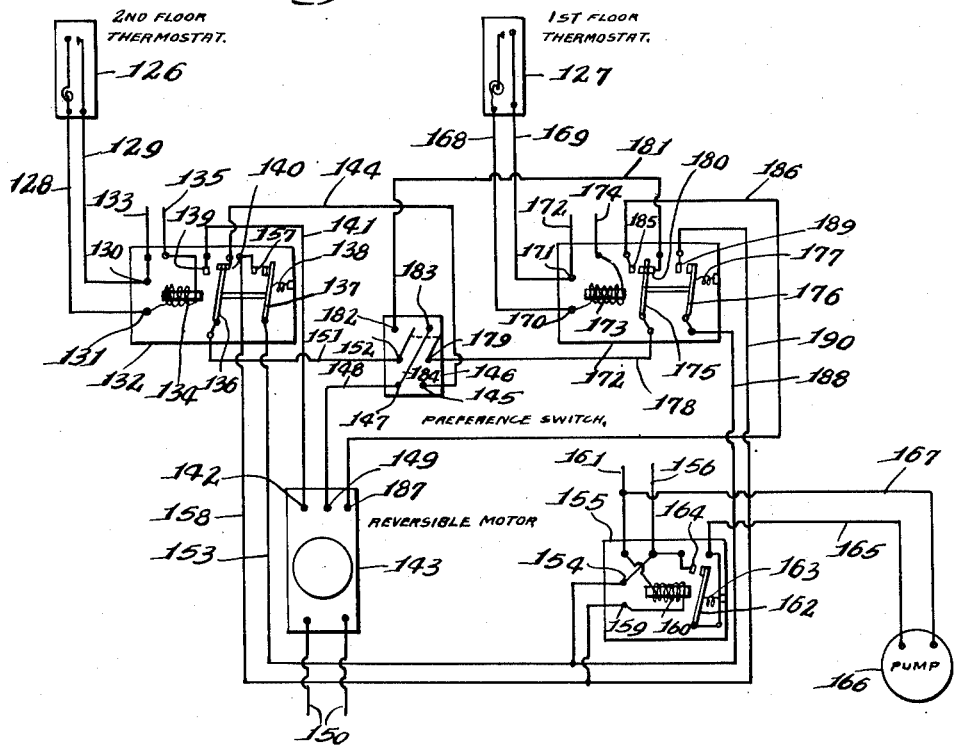
Fig. 25 shows an electrical circuit including the reversible motor illustrated in Figs. 23 and 24 for automatically controlling the temperatures in the lower and upper rooms.

The reversible motor shown in Fig. 23 can be employed in a control system for producing substantially a zonal heating effect in the upper and lower floors, i. e., an arrangement in which heat preference to either of these floors is separately controlled in each floor in accordance with the demand for heat therein. A suggested electrical circuit for accomplishing these results is illustrated in Fig. 25. Briefly, it consists of a room thermostat for each floor, a manual controlled switch whereby preference of heat supply may be given to either floor while retaining a capacity for shifting to the other floor on demand after the preferred floor has been satisfied, all associated with the reversible motor and a pump for forcing water through the heating coil 16 (see Fig. 1).

The numerals 126 and 127 designate room thermostats which are respectively positioned in the second and first floors and are responsive to the heat demands in these localities. The thermostat 126 is connected by wires 128 and 129 to the terminals 130 and 131, respectively, of a relay 132, the terminal 130 being connected to a power wire 133 and the terminal 131 being connected through a holding coil 134 to a power wire 135. Hence, when the thermostat 126 closes, the coil 134 is energized.

The relay 132 also includes a pair of switches which are connected for simultaneous movement, one being of the single pole, double throw switch 136 and the other the single pole, single throw switch 137 and both switches are biased to the positions shown in Fig 25 by a spring 138. The switch 136 swings between contacts 139 and 140, the former connecting by wire 141 with terminal 142 on a reversible motor 143, which is drivably connected to any of the pivoted baffles above described, while the latter contact connects by wire 144 with a contact 145 provided on one end of a manually operated, double pole, double throw switch 146, hereinafter referred to as the preference switch. The adjacent, end contact 147 of the switch 146 connects by a wire 148 with the common terminal 149 of the motor 143 which is power supplied by wires 150—150. The pivoted end of the switch 136 connects by wire 151 with one of the intermediate terminals 152 of the preference switch 146.

The pivoted end of the switch 137 connects by a wire 153 with a terminal 154 on a relay 155 which in turn is connected to a power wire 156.

A contact 157, which is engaged by the switch 137 when swung from the position shown in Fig. 25, connects by wire 158 with a terminal 159 on the relay 155 and thence through a holding coil 160 with a power wire 161. Therefore, when the switch 137 engages contact 157, the coil 160 is energized. Operably related to the coil 160 is a pivoted switch 162 which is biased in the retracted or open position shown by a spring 163. When the switch 162 is closed by energization of the coil 160, it engages a contact 164 which is electrically connected to the power wire 156, while the pivoted end of the switch 162 connects by wire 165 with the driving motor of a pump 166 and the motor in turn connects by wire 167 with power wire 161, thus completing the electric drive for the pump. It will be understood that the pump 166 would be connected in the hot water circuit portion of the heating system as indicated for the pump 18 in Fig. 1.

The first floor thermostat 127 connects by wires 168 and 169 with terminals 170 and 171, respectively, of a relay 172, and the terminal 171 is electrically connected to a power wire 172 while the terminal 170 connects through a holding coil 173 with a power wire 174. Operably related to the coil 173 are connected switches 175 and 176 which are identical with switches 136 and 137, respectively, with the former being biased in the position shown by a spring 177. The pivoted end of the switch 175 connects by wire 178 with the other intermediate terminal 179 of the preference switch 146, while the contact 180, with which the switch 175 is shown in engagement, connects by wire 181 with an end contact 182 of the preference switch. The adjacent, end contact 183 of the latter switch connects by wire 184 with the contact 147 and hence with common terminal 149 on the reversible motor 143. The other contact 185, with which the switch 175 engages, connects by wire 186 with terminal 187 on the motor. Hence, when power is applied across the terminals 142—149, the motor rotates in one direction, and when applied across the terminals 149—187, the motor rotates in the opposite direction.

The pivoted end of the switch 176 connects by wire 188 with wire 153, or directly to the terminal 154, while the contact 189, with which the switch 176 engages, connects by wire 190 with wire 158, or directly to the terminal 159.

The operation of the circuit shown in Fig. 25 will now be described. As illustrated, the thermostats 126 and 127 are open, as is also the preference switch 146. This circuit may be conditioned to give heat preference to either floor and after the selection of one floor by actuation of the preference switch 146, demand for heat by the non-selected floor will not be answered so long as the preferred floor demand heat, but will be satisfied after the preferred floor is satisfied. It will be obvious, however, that the non-selected floor always receive some heat when the baffle is in a position which prefers heat to the selected floor. Hence, the demand for heat by the non-selected floor referred to above is to be regarded as a preference demand after the demand of the selected floor has been satisfied. A movement of the switch 146 to a position giving preference to the theretofore non-selected floor reverses the situation as will now be shown.

Assuming that the parts are in the several positions shown in Fig. 25 in which the motor 143 and pump 166 are at rest and that the arms of the preference switch 146 are swung to engage the contacts 145 and 147, which is a position giving heat preference to the second floor, then when the thermostat 126 closes in response to a demand for heat in the second floor, the coil 134 is energized and the switches 136 and 137 are swung to respectively engage the contacts 139 and 157. The engagement of the contact 157 completes the circuit through the motor 143 by way of the wires 141, 148 and 151 in conjunction with the switch 136, contact 147 and terminal 152 which are bridged by one of the arms of the preference switch 146, and the power wires 150, power being applied to the motor across the terminals 142 and 149. Assuming that the baffle which is driven by the motor is in a position in which not as much heat is directed to the second floor as the new conditions demand, the motor 143 begins to rock the baffle to a position in which more heat is directed to the second floor.

Coincident with the engagement of the contact 139 by the switch 136, the switch 137 engages the contact 157, thus energizing the coil 160 and attracting the switch 162 to engage the contact 164 and complete the circuit through the motor which drives the pump 166. An adequate supply of hot water is therefore circulated through the heating coil 16 (see Fig. 1) and the heated air flows upwardly through the stack and joist space where its movement is controlled by the baffles. When the thermostat 126 is satisfied, the motor 143 and pump 166 stop and the switches 136, 137 and 162 return to the positions shown in the drawing.

If the first floor thermostat 127 demands heat while the second floor thermostat 126 is still demanding heat, the coil 173 will be energized and the switches 175 and 176 will be attracted to respectively engage the contacts 185 and 189, but this conditioning of the relay 172 does not affect the motor 143, since the switch 175 connects by wire 178, preference switch 146 and wire 144 with contact 140 which is not in engagement with switch 136 at this time. Hence, the circuit to the motor 143 through the relay 172 is not completed, and while the closing of the switch 176 completes the circuit through the relay 172 and the motor of the pump 166, this is a mere movement of parts since, under the assumed conditions, the pump 166 is then running.

If preference for the first floor in advance of satisfaction of heat demand by the second floor, or at any other time, is desired, it is only necessary to throw the preference switch 146 to engage the contacts 182 and 183, whereupon the thermostat 127 assumes primary control of the motor 143 and pump 166 in the same manner as described for the thermostat 126, except that the reversal of the motor shifts the baffles to direct more heat to the first floor.

Figure 26:
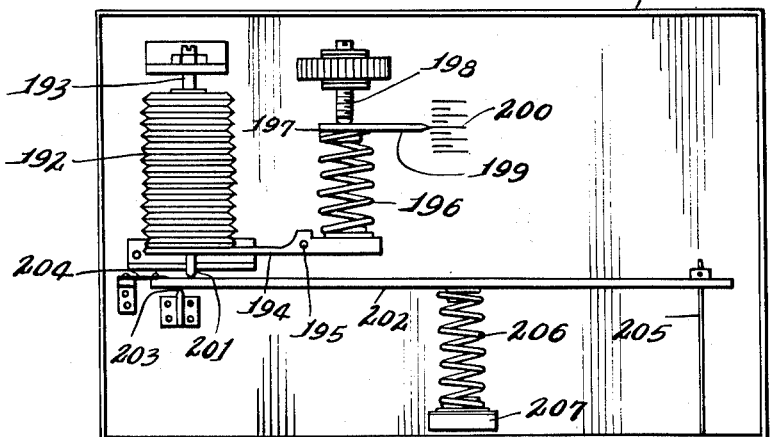
Fig. 26 is an elevation of a thermally responsive control which may be used to automatically regulate the positions of the baffles shown in Figs. 9, 10, 19, 20 and 24.

A further means for actuating the baffles is illustrated in Fig. 26 which takes the form of a thermal device which is responsive to room temperatures. This device may be mounted in a casing 191, shown with its cover removed, which may be positioned in the wall of a room above or below the baffles. It consists of a bellows member 192 that is filled with any of the customary liquids used in thermally responsive devices of this character, such as alcohol, and its upper end bears against an abutment 193 carried by the casing 191. The lower end of the member 192 rests on one arm of a lever 194 which is intermediately pivoted at 195 in the casing and the lower end of a helical spring 196 is mounted on the other lever arm. The upper end of the spring 196 carries a cap 197 which is engaged by an adjusting screw 198 whereby the tension of the spring may be adjusted and hence any initial length of the member 192 established. The cap 197 may include a pointer 199 which registers with a scale 200.

Depending from the lower end of the bellows member 192 and projecting through the arm of the lever 194 is a finger 201 whose lower end bears against a lever 202 that is rockable on a knife edge 203 and hinged at one end to the casing at 204. The opposite end of the lever 202 is secured to one end of a wire 205 whose opposite end is secured to a baffle as already described. Extension of the bellows member 192 by the absorption of heat from the adjacent room moves the baffle in an appropriate direction and movements of the baffle in the opposite direction when the member shortens is accomplished by a helical spring 206 which bears constantly against the under side of the lever 202 and against an abutment 207. It will be understood that the arms of the lever 202 will be related so that the comparatively short working range of the bellows member 192 will effect the relatively greater movements of the baffles.

Where the thermal device shown in Fig. 26 is used for the fire door type of baffle, a reel 208 is mounted on the free end of the lever 202 on which a surplus quantity of the wire 205 is wound. The unreeling of this wire enables replacement of the fusible links in the manner already described. Under normal conditions, unreeling of the wire is prevented by means of a block 209 which rests on the upper side of the lever 202 and through which the wire 205 passes. A screw 210 threaded in the block locks the same to the wire.

Any of the foregoing baffle arrangements can be used with other primary sources of heat such as a hot air furnace as illustrated in Fig. 28, or a steam boiler as illustrated in Fig. 29, or a gravity circulating hot water heating system (not shown) may be substituted for the forcibly circulated system shown in Fig. 1. Further, it will be understood that, as shown in Fig. 9, any of the baffles illustrated in Figs. 13, 14 and 20 may be weighted to facilitate gravity movements thereof.

Referring to Fig. 28, the numeral 211 indicates a characteristic hot air furnace which is located in the basement 10 and surrounded by a bonnet 212 whose upper end communicates with and supplies hot air to the lower end of the stack 20. This hot air is then controlled by any of the baffles above described, whether located at the top of the stack or the sides or intermediately of the joist space. The returning air flows downwardly through the ducts 28 into the basement 10 and thence through an opening 213 in the lower part of the bonnet 212 for resumption of the cycle.

In Fig. 29, a steam boiler 214, positioned in the basement 10, is connected by supply and return pipes 215 and 216, respectively, with a heat transfer coil 217 that is located in the lower part of the stack 20 in a position comparable to the coil 16 in Fig. 1. The air heated by the coil 217 may be controlled by any of the baffle arrangements already described.

I claim:

1. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, and baffle means in the joist space arranged to direct the warmer portion of the air to flow along the under side of the structure and thereby determine the ratio of heat transfer from the air to the floor structure and ceiling.

2. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, and funnel-like baffle means at the junction of the joist space and ducts arranged to direct the warmer portion of the air to flow along the under side of the structure and thereby determine the ratio of heat transfer from the air to the floor structure and ceiling.

3. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, and the stack extending partially into the joist space to form baffle means for directing the warmer portion of the air to flow along the under side of the structure and thereby determine the ratio of heat transfer from the air to the floor structure and ceiling.

4. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, and strip baffle means within and extending along one horizontal dimension of the joist space between the stack and ducts, the baffle means being arranged to direct the warmer portion of the air to flow along the under side of the structure and thereby determine the ratio of heat transfer from the air to the floor structure and ceiling.

5. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, and baffle means in the joist space having its upper edge adjustably spaced from the floor structure to direct the warmer portion of the air to flow along the under side of the structure and to vary the ratio of heat transfer from the air to the floor structure and ceiling.

6. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, a baffle in the joist space pivoted at its lower end adjacent the ceiling and extending towards the floor structure for directing the warmer portion of the air to flow along the under side of the structure, and means for rocking the baffle to any selected position to determine for such position the ratio of heat transfer from the air to the floor structure and ceiling.

7. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, a baffle in the joist space pivoted at its lower end adjacent the ceiling and the upper end of each duct and extending towards the floor structure for directing the warmer portion of the air to flow along the under side of the structure, and means for rocking the baffle to any selected position to determine for such position the ratio of heat transfer from the air to the floor structure and ceiling.

8. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, and the stack extending partially into the joist space and having openings in one or more side walls of the extension and a closure at its upper end, a baffle pivoted along the lower edge of and registering with each opening for directing the warmer portion of the air to flow along the under side of the floor structure, and means for simultaneously rocking the baffles to any selected positions to determine for such positions the ratio of heat transfer from the air to the floor structure and ceiling.

9. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, a baffle in the joist space pivoted at its lower end adjacent the ceiling and the upper end of each duct and extending towards the floor structure for directing the warmer portion of the air to flow along the underside of the structure, the lower portion of the baffle being composed of fire resistant material, means for rocking the baffle to any selected position to determine for such position the ratio of heat transfer from the air to the floor structure and ceiling comprising an adjuster and connections between the adjuster and baffle including a fusible link and a weight in the associated duct, the weight being separately connected to the link and baffle and acting to maintain the baffle in the adjusted position, and an abutment bridged across the supper end of the last named duct and engaged by the fire resistant portion of the baffle under the pull of the weight to close the last named duct when the link ruptures on exposure to a predetermined temperature.

10. In a heating system for a multistory building, an open joist space included between the floor structure of an upper story and the ceiling of the adjacent lower story, an interior stack extending through the lower story, ducts in the outer side walls of the lower story, the stack and ducts communicating at their respective upper ends with the joist space, a plenum chamber beneath the lower story common to the lower ends of the stack and ducts, heating means in the lower end of the stack, the stack, joist space, ducts and chamber constituting conduit means through which warm air flows thermogravitationally upwardly through the stack into the joist space and downwardly through the ducts to the chamber, a baffle in the joist space pivoted at its lower end adjacent the ceiling and extending towards the floor structure for directing the warmer portion of the air to flow along the under side of the structure, and means for rocking the baffle to any selected position to determine for such position the ratio of heat transfer from the air to the floor structure and ceiling, the baffle being composed of heat resistant material and sized in one position thereof to close the associated duct.

LAWRENCE J. SMITH.

REFERENCES CITED

The following references are of record in the file of this patent:

UNITED STATES PATENTS

| Number | Name | Date |
|---|---|---|
| 594,597 | Burrows | Nov. 30, 1897 |
| 1,343,330 | Miles | June 15, 1920 |
| 1,349,175 | Walker | Aug. 10, 1920 |
| 2,117,712 | Evans | May 17, 1938 |
| 2,181,814 | Knapp | Nov. 28, 1939 |
| 2,206,119 | Persons | July 2, 1940 |
| 2,240,951 | Hamjy | May 6, 1941 |
| 2,364,220 | Johnson | Dec. 5, 1944 |

FOREIGN PATENTS

| Number | Country | Date |
|---|---|---|
| 2,009 | Great Britain | July 27, 1914 |